United States Patent [19]
Chang et al.

[11] Patent Number: 6,016,257
[45] Date of Patent: Jan. 18, 2000

[54] VOLTAGE REGULATED POWER SUPPLY UTILIZING PHASE SHIFT CONTROL

[75] Inventors: Chin Chang, Ossining; Joseph En-Cheng Chang, Norwich; Gert W. Bruning, No. Tarrytown, all of N.Y.

[73] Assignee: Philips Electronics North America Corporation, New York, N.Y.

[21] Appl. No.: 08/909,922

[22] Filed: Aug. 12, 1997

Related U.S. Application Data

[63] Continuation-in-part of application No. 08/773,243, Dec. 23, 1996, Pat. No. 5,781,418.

[51] Int. Cl.[7] .................................................. H02M 3/335
[52] U.S. Cl. .................................. 363/17; 363/98; 363/2; 363/149
[58] Field of Search .................................. 363/17, 98, 2, 363/132, 149

[56] References Cited

U.S. PATENT DOCUMENTS

| | | | |
|---|---|---|---|
| 4,805,081 | 2/1989 | Chambers et al. | 363/96 |
| 4,952,849 | 8/1990 | Fellows et al. | 315/307 |
| 5,382,882 | 1/1995 | Nerone | 315/307 |

OTHER PUBLICATIONS

"A New and Improved Control Technique Greatly Simplifies the Design of ZVS Resonant Inverters and DC/DC Power Supplies", by Nalbant, Proceedings of IEEE Applied Power Electronics Conferences, Mar. 1995, pp. 694–701.

"A Comparison of Half–Bridge Resonant Conveter Topologies", by Steigerwald, IEEE Transactions on Power Electronics, Apr. 1988, pp. 174–181.

*Primary Examiner*—Shawn Riley
*Attorney, Agent, or Firm*—Bernard Franzblau

[57] ABSTRACT

A power supply, including a resonant circuit having an output voltage and a current oscillating therethrough, and a voltage-fed half-bridge inverter producing a source voltage at an output coupled to the resonant circuit. The inverter is responsive to a driving signal. A driving circuit has a first input representing the sensed current oscillating through the resonant circuit, a second input representing the output voltage, and a reference voltage. The driving circuit includes compensation circuitry for maintaining the output voltage at the reference voltage and commanding a phase shift angle, and phase-shifting circuitry producing the driving signal based on a phase-shift of the sensed current. The amount of phase shift is commanded by the compensation circuitry.

15 Claims, 17 Drawing Sheets

VOLTAGE REGULATED POWER SUPPLY UTILIZING PHASE SHIFT CONTROL

CROSS REFERENCE TO RELATED APPLICATIONS

This is a continuation-in-part of U.S. application Ser. No. 08/773,243, filed Dec. 23, 1996 now U.S. Pat. No. 5,781,418, which is incorporated by reference herein.

BACKGROUND OF THE INVENTION

1. Technical Field

The invention generally concerns power supplies and lighting ballasts, and more particularly to voltage regulation for zero-voltage-switched (ZVS) inverters.

2. Description of the Prior Art

Electronic lamp ballasts include inverters to provide a high frequency substantially square wave voltage output to a load. The load typically includes a resonant circuit and lamps. A typical inverter circuit includes power switching circuitry involving transistors to convert a DC input to a desired high frequency AC output.

A control circuit, such as disclosed in U.S. Pat. No. 4,952,849 to Fellows et al., for driving the switching circuitry of a voltage-fed inverter, senses current flowing through the load to control the switching circuitry. The switches are turned on so as to minimize damage and losses thereto during transition and is commonly referred to as zero-voltage switching (ZVS). The switching technique minimizes the voltage across the switch as the switch is being turned on.

The switching frequency of the inverter is typically above the resonant frequency of the resonant circuit, that is, to maintain the resonant circuit in an inductive mode. More generally, in the zero-voltage switching scheme, it is critical to maintain the circuit in an inductive mode when transitioning between the power switches, regardless of the load type. Otherwise, large power losses and damage to the components within the circuit can result.

One commonly used method to achieve zero-voltage switching is to maintain the switching frequency higher than the resonant frequency, as described in Steigerwald, "A Comparison of Half-Bridge Resonant Converter Topologies," *IEEE Transactions on Power Electronics,* April 1988, pp. 174–181, incorporated by reference herein. This frequency-based scheme can be easily implemented using voltage controlled oscillators (VCO). However, a critical requirement of such a control method is that prior knowledge of the resonant frequency is needed to determine the frequency sweeping region. In simple applications, for example, in LC resonant inverter-based power supplies and electronic ballasts with a single lamp, when the maximum gain frequency does not change significantly during the load and line changes, the frequency-based control method operates successfully.

However, in some cases, the characteristics of the resonant circuit can change rapidly with lamp loads, bus voltage, ambient conditions or aging of the components. Such changes can affect the operating mode of the resonant circuit. Simple frequency based control methods may be unable to adapt to the new frequency-sweep region and therefore be unable to maintain zero voltage switching.

The circuit of Nalbant, "A New and Improved Control Technique Greatly Simplifies the Design of ZVS Resonant Inverters and DC/DC Power Supplies," *Proceedings of IEEE Applied Power Electronics Conference,* March 1995, pp. 694–701, achieves zero voltage switching by increasing the operating frequency above the resonant frequency. Switching occurs by setting thresholds on the current flowing in a loading matching network. When one of these thresholds is crossed, switching occurs in the inverter. This approach has the disadvantage that threshold values must be chosen and set, and complex logic must be implemented. If the current values experience large fluctuations, the threshold may not be crossed and a correct switching cycle may be missed, or the wrong operating frequency may result. Here, the inductor current information is not further used for output regulation.

Accordingly, it is an object of the invention to provide various voltage regulation methods in a zero-voltage switching scheme for a power supply or ballast having a voltage-fed inverter which overcomes the above mentioned disadvantages of the prior art.

SUMMARY OF THE INVENTION

A high frequency resonant power supply is disclosed which includes a resonant circuit having an output voltage and a current oscillating therethrough, a voltage-fed half-bridge inverter producing a source voltage at an output coupled to the resonant circuit, the inverter being responsive to a driving signal. The power supply further includes a novel driving circuit producing the driving signal.

The driving circuit has compensation circuitry regulating the output voltage with respect to a reference voltage and commanding a phase shift angle. Phase-shifting circuitry in the driving circuit applies a phase-shift to the sensed current, and the amount of phase shift is commanded by the compensation circuitry.

The phase-shifting circuitry applies the positive phase angle shift to the sensed current input such that the voltage at the output of the inverter is leading the sensed current input with the predetermined positive phase angle. The driving signal may actuate a switch in the inverter when the phase-shifted sensed current signal crosses zero. The phase shifting circuitry preferably includes an all-pass filter.

In a preferred embodiment, the driving circuit includes a filter for suppressing a low frequency component of the sensed current flowing through the resonant circuit. The power supply may further include a load, wherein the load is a discharge lamp.

In a preferred embodiment, the driving circuit includes a hysteresis control with respect to the sensed current signal. The hysteresis control is used to establish the switching times. The hysteresis relation is so designed that the zero-voltage switching is always achieved at each switching time, regardless of the load situation.

A method for switching a power supply is also disclosed which includes the steps of providing a resonant circuit having a current oscillating therethrough; providing an inverter responsive to a driving signal and producing a voltage at an output coupled to the resonant circuit; sensing the current oscillating through the resonant circuit; applying a phase angle shift to the current; applying a driving signal to the inverter based upon the phase-shifted current.

In a preferred embodiment, the method further includes the step of filtering the sensed current signal to suppress low frequency components prior to applying the phase angle shift. In the method for switching a power supply, the step of applying a driving signal to the inverter preferably includes actuating a switch in the inverter when the phase-shifted current crosses zero.

A method for switching a power supply is also disclosed which includes the steps of providing a resonant circuit having a current oscillating therethrough; providing an inverter responsive to a driving signal and producing a voltage at an output coupled to the resonant circuit; sensing the current oscillating through the resonant circuit and producing a sensed current signal proportional to the current; applying a phase angle shift to the sensed current signal and producing a phase-shifted signal; and applying a driving signal to the inverter based upon zero-crossing points of the phase-shifted signal.

It is an object of the invention to provide a voltage regulation method using a phase shift of the signal, for example, for the signal applied to the resonant inverters.

It is an object of the invention to provide a voltage regulation method using a level shifted control reference compared with the sensed current signal, for example, for the signal applied to the resonant inverters.

It is a further object of the invention to provide a voltage regulation method, using a level-shifted control reference multiplied with the sensed current signal, for example, for the signal applied to the resonant inverters.

It is an object of the invention to produce an improved zero-voltage switching scheme which employs a phase-shifting technique in timing the switching cycles in the inverter.

It is another object of the invention to provide a switching scheme which does not require prior identification of the resonant frequency.

It is a further object of the invention to provide a general switching scheme which is applicable to resonant circuits of second order and higher.

It is yet another object of the invention to provide a switching scheme which does not require complex threshold logic for the timing of the switches.

These and other objects, features and advantages of the invention will become apparent with reference to the accompanying drawings and the following detailed description and claims.

DETAILED DESCRIPTION OF THE PREFERRED EMBODIMENTS

Figure 1:
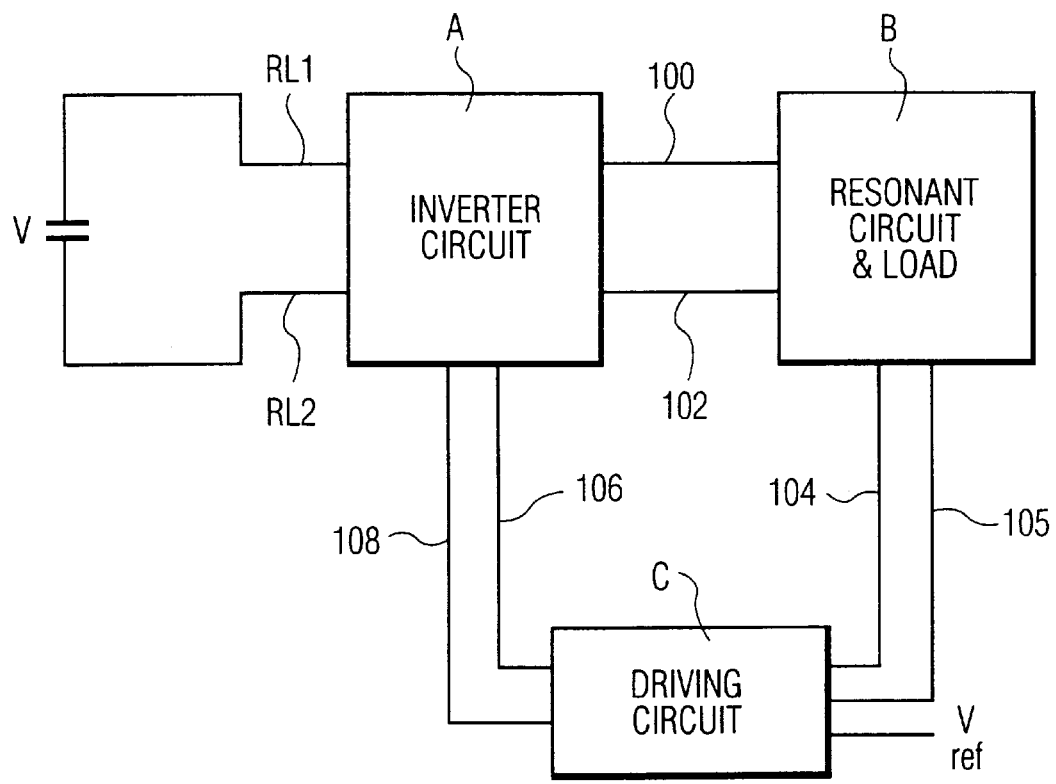
FIG. 1 is a block diagram of the power supply in accordance with an exemplary embodiment of the subject invention.

The power supply circuit shown in FIG. 1 includes a voltage source V, inverter circuit A, resonant circuit and load B, and driving circuit C which controls inverter circuit A. Voltage source V is a direct current voltage source supplying inverter circuit A via lines RL1 and RL2. Alternatively, an AC voltage source may be substituted in conjunction with a rectifier circuit, which may further include power factor correction. Inverter circuit A is of the voltage-fed half-bridge topology, and is under control of the driving circuit C. Resonant circuit B receives the substantially square wave output of inverter circuit A on lines 100 and 102 and converts it into a substantially sinusoidal lamp current. In the exemplary embodiment, the load is a parallel-loaded lamp system.

Figure 8:
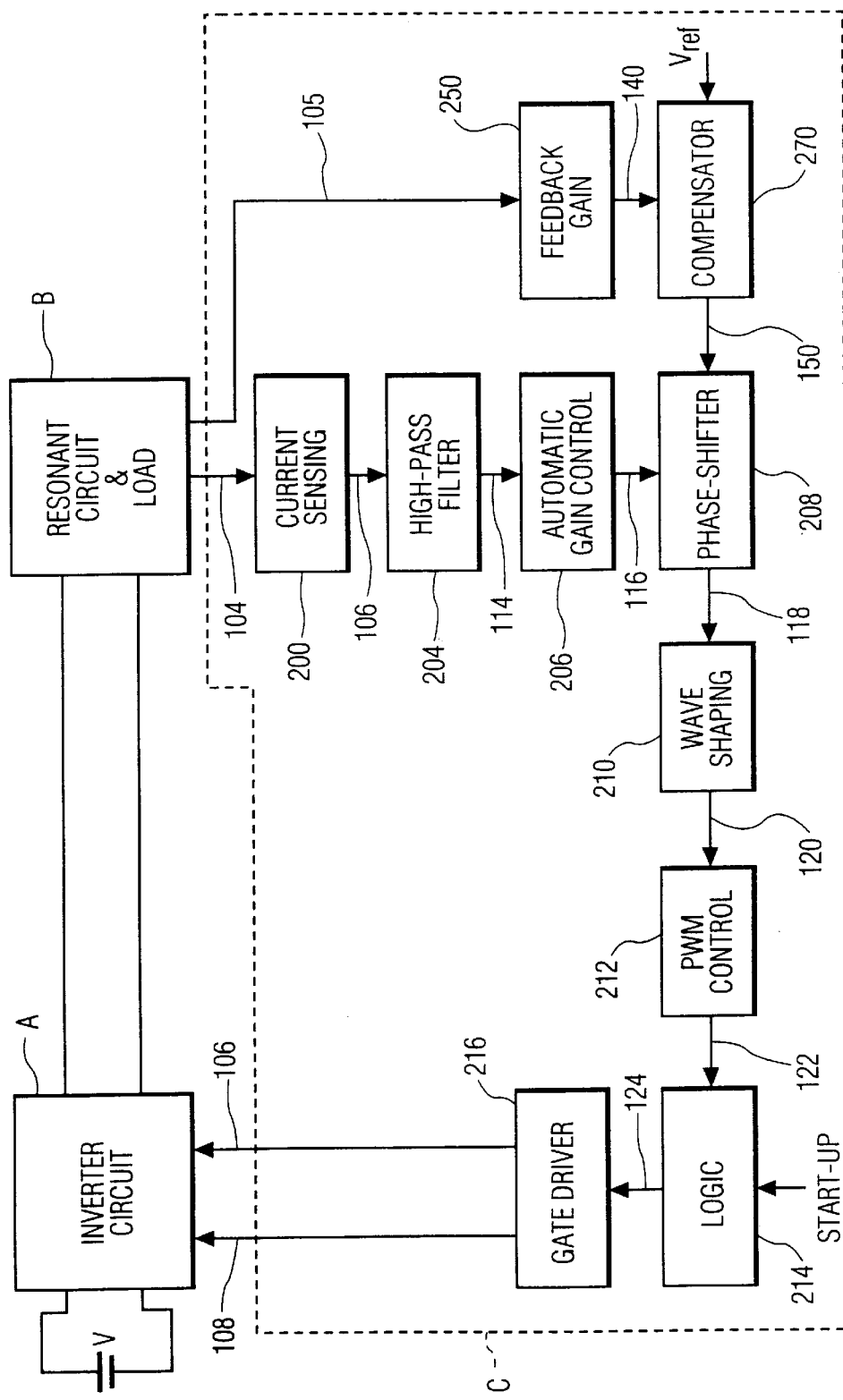
FIG. 8 is a block diagram of the power supply, illustrating the particular functions of the driving circuit.

The driving circuit C receives a voltage signal proportional to the current flowing through the resonant circuit B via line 104. Phase shifting circuitry is present in driving circuit C to shift the sensed current signal by a predetermined phase angle. The phase angle $\phi$ may be an input to the system or the output of a voltage compensator, e.g. circuit 270 (FIG. 8). This reference voltage $V_{ref}$ could also be used as a dimming interface in dimmable lamp systems. The driving signals 106 and 108 to the inverter are based upon this phase-shifted current signal to provide zero-voltage switching and to control inverter circuit A.

The voltage across the load is present on line 105. This signal is used to provide voltage feedback and regulation. Voltage across the load is compared with a reference voltage $V_{ref}$ in driving circuit C as will be described below.

As is known in the art, the normalized frequency $\Omega$ (i.e. $\Omega=\omega_s/\omega_r$, where $\omega_r$ is the resonant frequency and $\omega_s$ is the operating frequency) and the quality factor Q uniquely determine the second order circuit characteristics. Thus, when the quality factor Q is known, the power source frequency $\Omega$ is traditionally used to control the circuit voltage gain A, since $A=f(\Omega,Q)$. Likewise, the input phase angle $\phi$ between the voltage and current is a function of the operating frequency, i.e. =g(Ω,Q). Thus, for a particular quality factor Q we can find an inverse function for frequency, i.e. Ω=h(φ), in the region where the relation between φ=g(Ω,Q) and Ω is one-to-one. That is, there is a unique solution in which there is one operating frequency for a particular phase angle. The function in this region is plotted in FIG. 2(a). Substituting the function Ω(φ) into the known expression for circuit voltage gain A(Ω) results in a relation A(φ), which is plotted in FIG. 2(b). Therefore, it is possible to regulate the voltage gain A by using the input phase angle φ as a control variable.

As described above, there may be a region in which the relation between phase angle φ and frequency Ω is not one-to-one. Thus, for each chosen φ, there may be two or more corresponding frequencies. In order to use the phase shift based control in this region, some measures need to be taken to eliminate either the higher frequency branch or the lower frequency branch. Properly designed filters could be used to serve this purpose, as will be described hereinbelow.

Figure 2A:
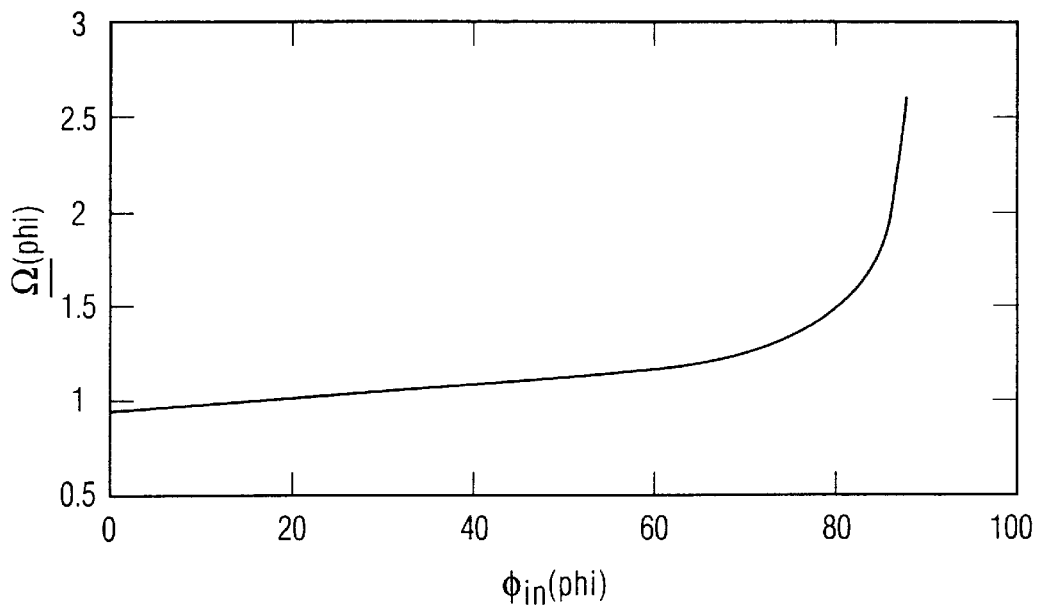
FIG. 2(a) is a curve illustrating normalized frequency $\Omega(\phi)$ as a function of the phase angle $\phi$ between current and voltage.
Figure 2B:
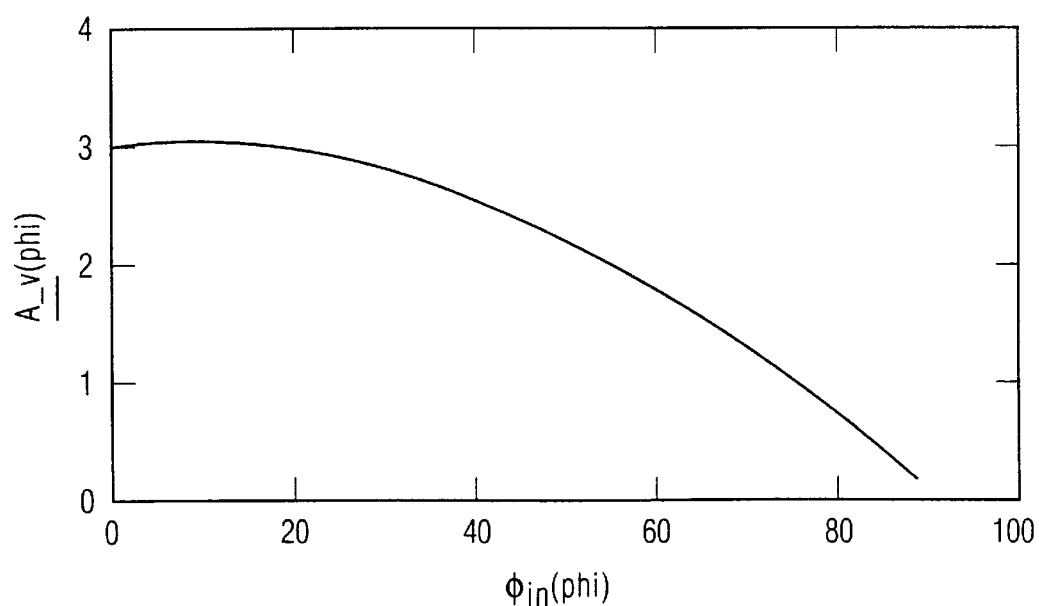
FIG. 2(b) is a curve illustrating circuit voltage gain as a function of the phase angle between current and voltage.

In the implementation of the phase shift based control method, the input phase angle φ is the driving variable and the source frequency is a derived variable along the curves of FIGS. 2(a) and 2(b). An open or closed loop system may be used to implement the phase shift based control scheme.

Figure 3:
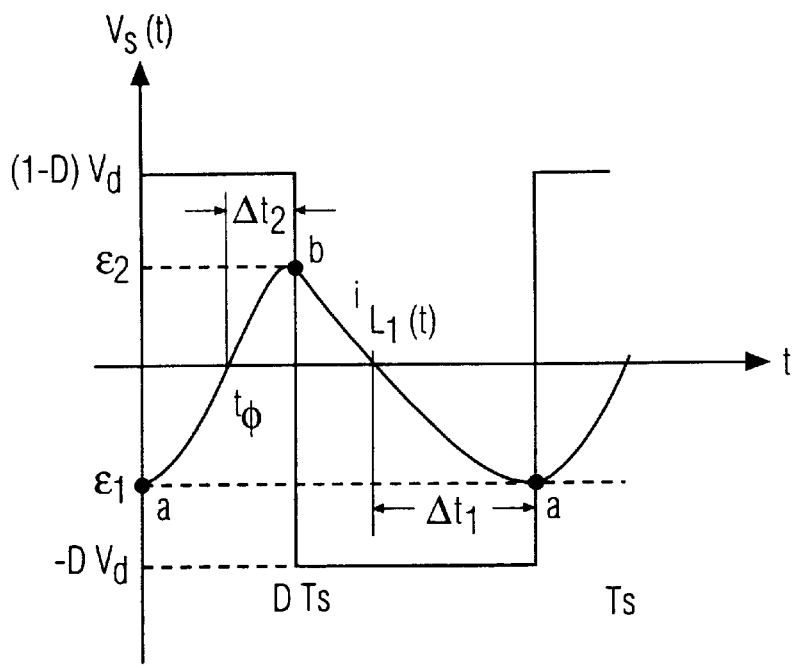
FIG. 3 is time plot of the current flowing through the resonant circuit and voltage.

The bridge type inverter output voltage $V_s$ and the current flowing through the resonant circuit $i_L$ are plotted in the time domain in FIG. 3. The phase angle between the voltage $V_s$ and current $i_L$ is φ. The phase angle is defined as $\phi=2\pi(t_\phi/T_s)$, where $t_\phi$ is such that $i_L(t_\phi)=0$, or the zero current crossing point. By sensing the current signal $i_L$, processing it with a driving circuit and driving the switches of the inverter, a feedback loop is implemented.

Figure 4A:
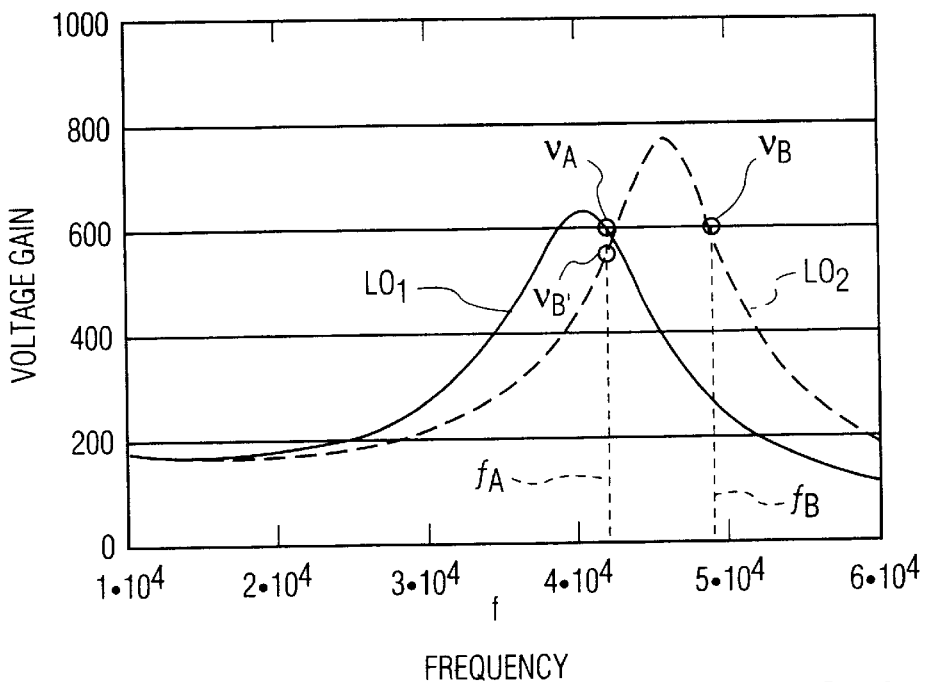
FIG. 4(a) is a plot of the relationship between voltage gain and frequency for a lamp load.
Figure 4B:
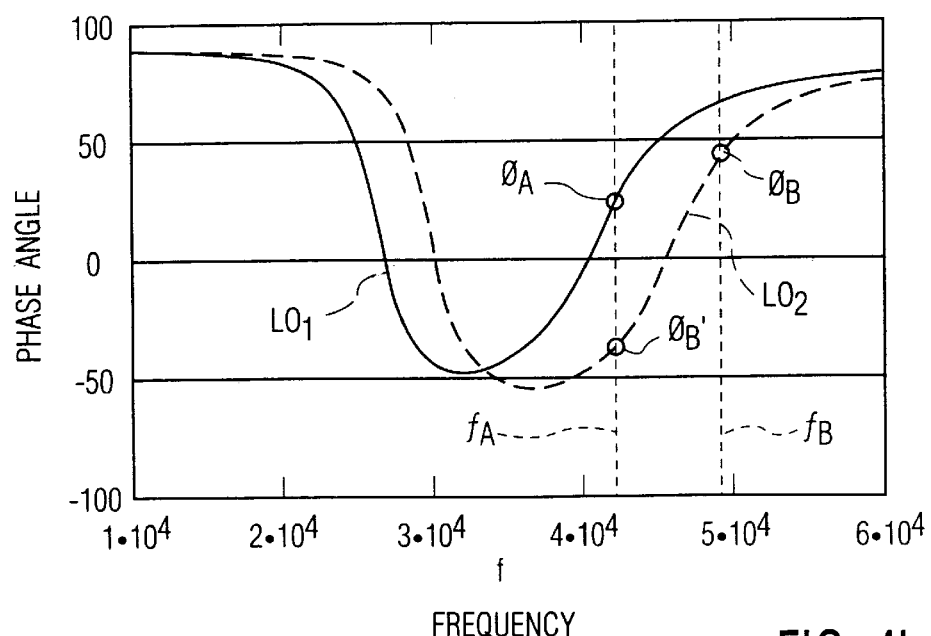
FIG. 4(b) is a plot of the relationship between phase angle and frequency for a lamp load.
Figure 7:
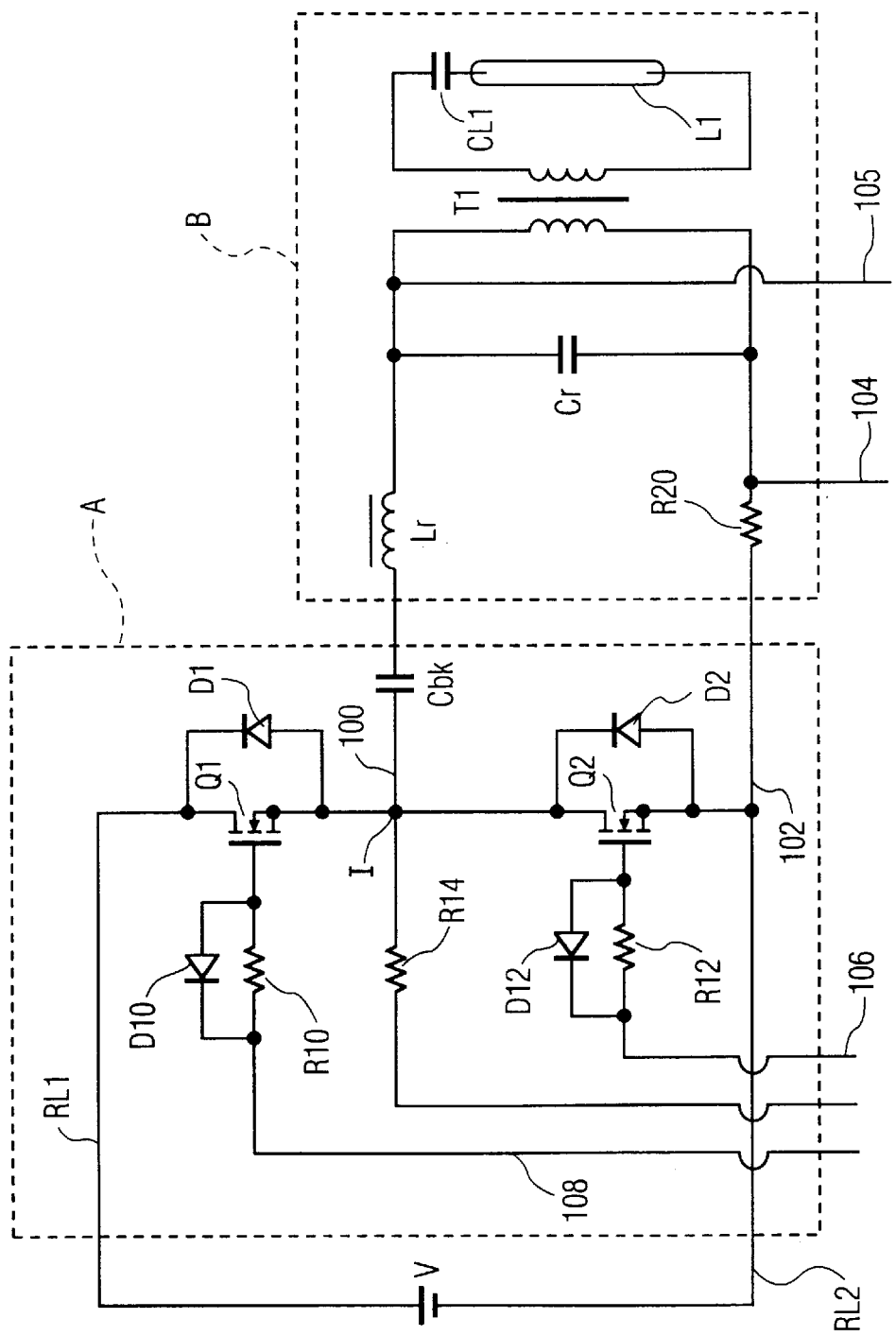
FIG. 7 is a schematic diagram of the inverter and the power supply.

With the circuit topology as in FIG. 7, the voltage gain and the phase angle are plotted versus frequency, see FIGS. 4(a) and 4(b), for a lamp load configuration. As described above, the inverter is favorably operated in the higher frequency branch of the voltage gain frequency curves where the input phase angles are kept positive.

When the load changes, the steady state operating point shifts in order to achieve a regulated output voltage. For a step change in the load, the steady state operating point shifts from one curve to another. In order to regulate the output voltage to a constant value, the corresponding frequency has to be changed. In some cases, the relationship is strongly dependent on the load so that the voltage gain/frequency curves for different loads are widely spread, e.g. when the lamp resistance changes due to the dimming operation. Traditional frequency based control method has difficulty in reaching the proper operating points during fast load change. Moreover, the power switches in the prior art system tend to lose zero-voltage switching during the process.

Figure 5:
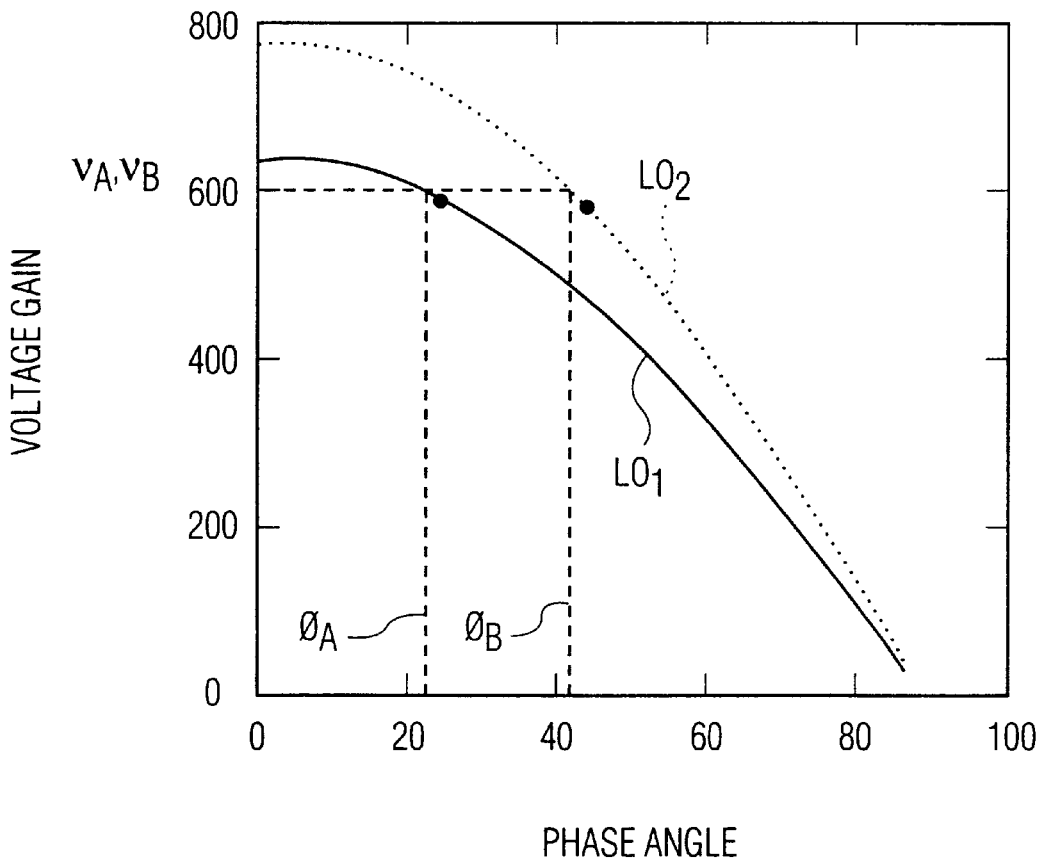
FIG. 5 is a plot of the relationship between voltage gain and phase angle for a lamp load.

The voltage gain is plotted versus phase angle in FIG. 5 based on the relationships of voltage gain to frequency in FIG. 4(a) and phase angle to frequency in FIG. 4(b). When the load changes, the voltage gain versus frequency and the input phase angle versus frequency curves will change accordingly. At a first load condition illustrated by curve L01, the circuit operating point is at operating frequency $f_A$, voltage gain $V_A$ and phase angle $\phi_A$. The phase angle $\phi_A$ is positive which indicates the zero-voltage-switching condition for all bridge power switches, i.e. Q1 and Q2. When the load changes abruptly, the circuit characteristics change from curve L01 to L02 in FIGS. 4(a), 4(b) and 5. The traditional frequency sweeping based control method will move the operating point to an intermediate point having the same initial operating frequency $f_A$, but new voltage gain $V_{B'}$ and new phase angle $\phi_{B'}$ before sweeping to the new steady state point at operating frequency $f_B$, voltage gain $V_B$ and phase angle $\phi_B$. At this intermediate point, the phase angle $\phi_{B'}$ is negative. Therefore, the zero-voltage switching condition is not maintained, which in turn may cause switch failure. By implementation of the phase angle shift control scheme, the phase angle can be adjusted accordingly such that the output voltage is regulated, as illustrated in FIG. 5, Here, the operating frequency is adjusted indirectly. The phase angle change region remains at the positive side. This implies that the inductive mode is always maintained, even during the transient process. More specifically, in order to maintain a constant voltage gain, the values ε1 and ε2 of FIG. 3 need to be adjusted as described below.

Figure 6:
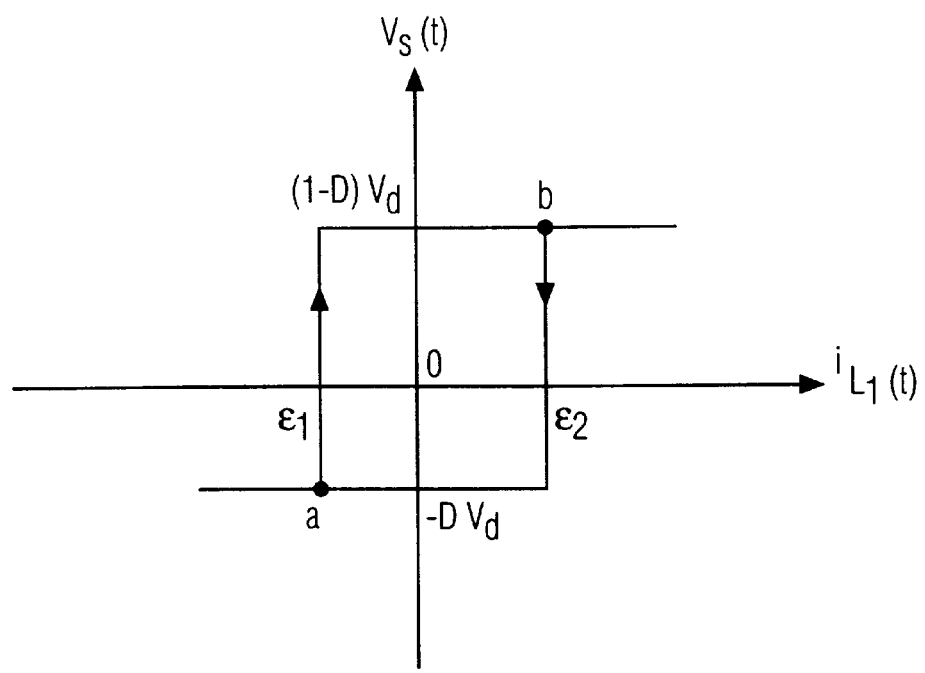
FIG. 6 is plot of the hysteresis function to achieve the switching cycling of FIG. 3.

A proposed relation H for the driving circuit is shown in FIG. 6. The trigger points a and b in FIG. 6 correspond to the points a and b in FIG. 3. The variables ε1 and ε2 are selected as the hysteresis threshold of FIG. 6, such that $i_L(t=0)=\epsilon 1$ and $i_L(t=DT_S)=\epsilon 2$ in FIG. 3. The time duration from the zero current crossing point $i_L=0$ to the trigger point a when $i_L$ is decreasing is $\Delta t_1$, and the duration from the zero current crossing point when $i_L$ is increasing to the trigger point b is $\Delta t_2$. Thus, the switching in the inverter occurs when the current $i_L$ crosses the values ε1 and ε2.

The quantities of ε1, ε2 and $\Delta t_1$, $\Delta t_2$ are related and are a function of the input phase angle φ. As ε1 or ε2 is decreased, the switching threshold is reached sooner. Consequently $\Delta t_1$ or $\Delta t_2$ decreases, and the switching frequency increases. Likewise, the converse is typically true that an increase in ε1 or ε2 results in a decrease in frequency.

Figure 10:
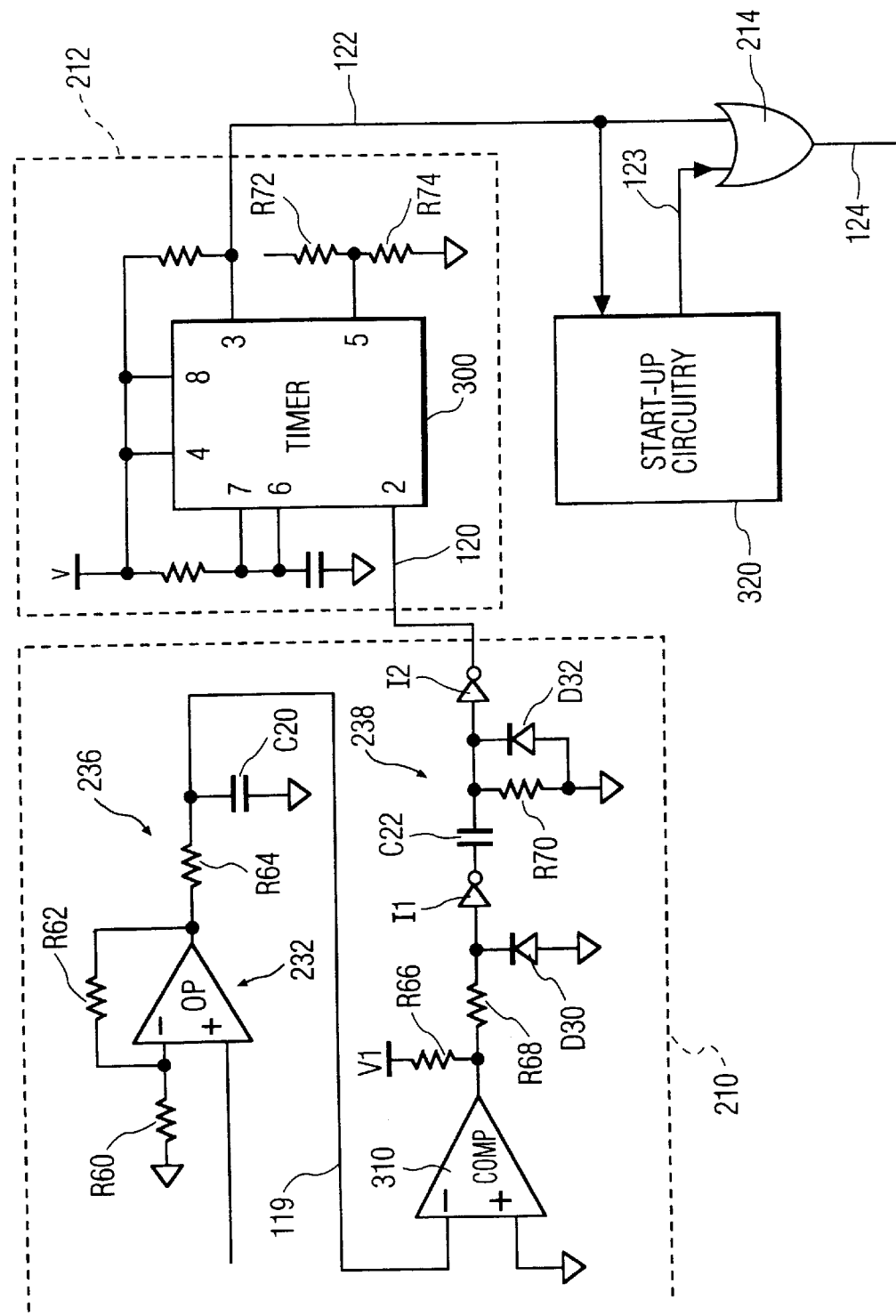
FIG. 10 is a partial schematic, partial logic diagram of a portion of the driving circuit, illustrating the wave-shaping and PWM functions.

In the power inverters, the load may change during the operation. If H is fixed, a new stable point may be reached as long as some necessary and sufficient conditions are met. The power inverter characteristics (oscillating frequency, gain, phase angle, etc.) change with the load. If such a change is not favorable to certain performance objectives, a necessary control scheme is needed. In this case, we can control the operation by adjusting the hysteresis H in FIG. 6. The control variables could be ε1 and ε2, which are used to effectively change the phase angle φ. The hysteresis is implemented in the preferred embodiment as a comparator circuit as illustrated in FIG. 10, although other methods are contemplated as within the scope of the invention. It is likewise contemplated that the hysteresis control may be implemented in conjunction with the phase-shift circuitry. For example, the sensed current signal may be phase-shifted and subsequently the phase shifted signal is used to create a driving signal by use of a hysteresis function as above.

The Inverter Circuit

Turning now to FIG. 7, inverter circuit A includes a pair of switches Q1 and Q2 which are arranged in a half-bridge configuration and convert the DC voltage from voltage source V to a high-frequency substantially square wave AC output signal across the inverter outputs, under the control of driver circuit C. Although the present embodiment is described with respect to a half-bridge inverter having a pair of switches, the switching scheme described herein is applicable to a full bridge topology having four switches. In such a configuration, the switches would be controlled in pairs rather than individually The switches Q1 and Q2 are preferably MOSFETs, although it is contemplated that BJTs could also be used as the power switches. Switch Q1 is effectively connected in parallel with diode D1, which could be the body diode if MOSFETs are used. A snubber capacitor may also be connected in parallel with switch Q1, which may include the junction capacitor incidental to switch Q1. Similarly, switch Q2 is connected in parallel with diode D2. Likewise, a snubber capacitor may also be connected in parallel with switch Q2, which may include the junction capacitor incidental to switch Q2. The drain of switch Q1 is connected via the rail RL1 to the output from the voltage source V. The source of the switch Q1 is connected to the drain of switch Q2. The control gate of switch Q1 is connected via control line 108 to a respective gate controller terminal of driving circuit C via a parallel arrangement of a resistor R10 and a diode D10. The anode of diode D10 is connected to the control gate of the switch Q1. The diode D10 provides rapid evacuation of charges from the control gate to enhance switching speed. The control gate of switch Q2 is similarly connected to a gate controller terminal of driving circuit C through control line 106. A similar parallel arrangement exists for switch Q2 with resistor R12 and diode D12. This particular arrangement has been implemented in conjunction with MOSFET switches Q1 and Q2. A different gate drive would be implemented for bipolar transistor switches, which is within the scope of the present invention Line 100 connects the midpoint I between the source of the switch Q1 and the drain of the switch Q2 to one end of the blocking capacitor Cbk. Capacitor Cbk blocks DC components of the inverter output voltage generated at node I. Line 112 connects the midpoint I via resistor R14 to driving circuit C, as will be described below Line 102 is connected to the source of switch Q2. Line 100 and line 102 serve as the output of inverter circuit A. The output of inverter A is a substantially square wave voltage source.

Resonant Circuit

With continued reference to FIG. 7, the resonant circuit B shapes the voltage and current waveforms to the load, such as a parallel loading of an instant start fluorescent lamps L1, which is in series with ballasting capacitor CL1.

The resonant circuit B includes resonant inductor Lr connected in series with the blocking capacitor Cbk via line 100. Resonant capacitor Cr is connected in parallel with a primary winding of an isolation transformer T1.

Due to the high Q filtering action of the resonant circuit B on the square wave voltage output of the inverter circuit A, the current flows with a substantially sinusoidal waveform. This current is sensed by the voltage drop on line 102 across resistor R20, having a small resistance. The sensed current signal on line 104 serves as the input to driving circuit C as will be described below.

Inverter Controller Circuit

FIG. 8 illustrates, in block diagram form, the components of driving circuit C. Current sensing circuit 200 senses the voltage drop across R20. High-pass filter 204 is used to filter one of the frequency components of the sensed current. The higher frequency component corresponding to the operating frequency is permitted to pass, but lower frequency signal components are suppressed from the current signal. As a result, the inverter is forced to operate in the higher frequency branch of the voltage gain frequency curves, where the input phase angles are kept positive. Automatic gain control 206 is utilized to control the amplitude of the signal so as to avoid saturating circuit components. Phase shifting circuitry 208 provides a phase shift of φ to the input signal. The amount of phase shift φ applied by phase shifting circuitry 208 is determined within a closed loop feedback scheme. The phase shift control voltage is the controlled output on line 105. The feedback path consists of feedback gain circuit 250. The reference voltage $V_{ref}$ is preselected and compared with the actual voltage in compensator 270, which provides an actuating signal on line 150. The signal on line 150 is used to control the amount of phase angle shift to regulate the output voltage. Wave shaping circuitry 210 is triggered by the zero-crossing points of the phase-shifted current signal. Pulse width modulation 212 produces the switch pulses, and gate driver 216 controls the timing of the switches and corresponding duty cycles. Start-up logic 214 transitions operation of the lamp from start-up to the steady state operating condition.

Figure 9:
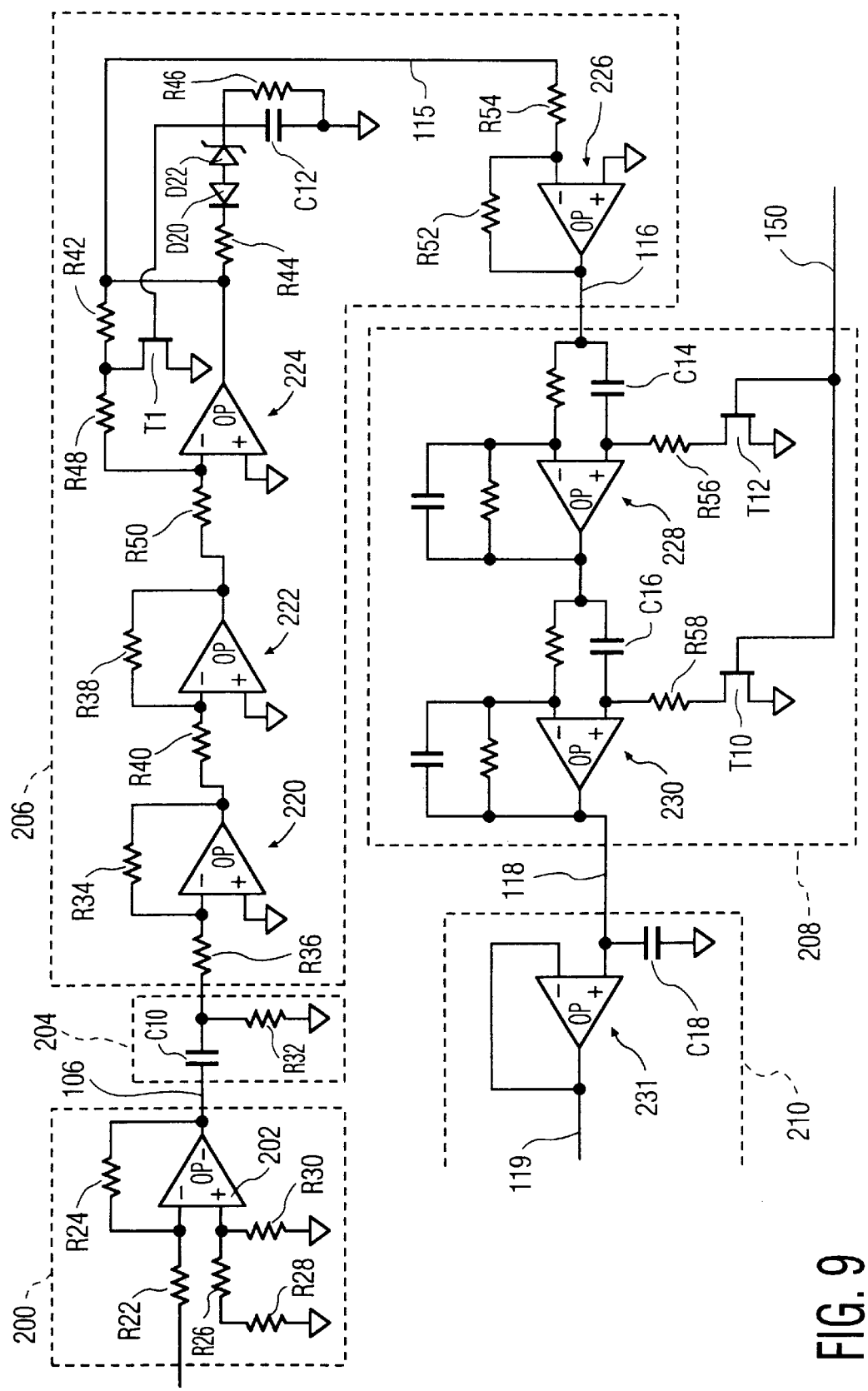
FIG. 9 is a schematic diagram of a portion of the driving circuit, illustrating the current signal amplifier, the high-pass filter, gain control, phase-shift circuitry.

Turning now to FIG. 9, current sensing circuit 200, a differential amplifier, senses the voltage drop across R20. R22, R24, R26, R28 and R30 are connected to op-amp 202, such as LT1122, to provide an output voltage signal on line 106 which is proportional to the current in the resonant circuit B. The signal is substantially sinusoidal at the operating frequency, and normally has lower frequency components. High pass filter 204 receives the signal of the sensed current. Capacitor C10 and resistor R32 are selected to suppress this low frequency component of the current signal. The present invention is applicable to resonant circuits of higher order as well. Therefore, there may be a plurality of low frequency components of the oscillating current signal which are suppressed by filter 204.

Automatic gain control 206 is provided on the output from high pass filter 204, which prevents the sensed current signal from saturating the components of the following circuitry. A pair of inverting op amps 220 and 222 are used to scale the signal magnitude and provide a positive gain factor. The ratio of external resistors R34/R36 for op amp 220 and R38/R40 for op amp 222 are selected to scale the signal. Because the amplitude of the signal flowing through the circuit may fluctuate, an automatic gain controller 224 is used to maintain the signal within a given range. Automatic gain controller 224 is followed by op-amp 226. The gain is controlled by voltage controlled resistor, such as JFET T1, in parallel with impedance R42. The gate of JFET T1 is connected to the feedback path consisting of impedance R44, diode D20, zener diode D22 and an RC circuit consisting of resistance R46 and capacitance C12. An additional inverting amplifier 226 further scales the signal by selection of resistors R52 and R54.

Phase shifting of the sensed signal is performed by the phase-shifting circuitry 208, which includes the pair of all-pass filters 228 and 230 in series. The all-pass filters incorporate op-amps such as LT1122. As is known in the art, such filters provide a loop gain of 1 but provide a predetermined phase angle shift to the signal passing therethrough. The amount of phase shift angle is determined by the control voltage on line 150, which is the output of the voltage compensator 270.

The circuitry of the present invention allows the phase angle to be a driving variable. As described above, the application of a positive phase angle to the sensed current signal ensures zero-voltage switching when the zero-crossing points of the phase shifted signal is used as a control signal for turning on the switches in the inverter circuit A. Ideally, the selection of any positive phase angle will assure zero-voltage switching. In practice, however; due to the output junction capacitance of the MOSFETs used for switches Q1 and Q2, there is a minimum phase angle requirement.

The phase angle may be implemented by an open loop or a closed loop based scheme. In the open loop scheme (not shown), the amount of phase shift may be preselected by selecting the amount of resistance R56 and R58 in parallel with the capacitors C14 and C16, respectively; to the noninverting input in all-pass filters 228 and 230, respectively. Such resistors R56 and R58 may be at ground potential (not shown). Alternatively, potentiometers (not shown) or voltage controlled devices, such as JFETs T10 and T12, may be used in the closed loop based scheme. The present circuit is shown with two all-pass filters, although a greater or fewer number of filters is contemplated. The optimum phase shift may be determined empirically from the circuit characteristics, such as the capacitance of the snubbing capacitors in parallel with switches Q1 and Q2 if used in the circuit, or the current.

Figure 9A:
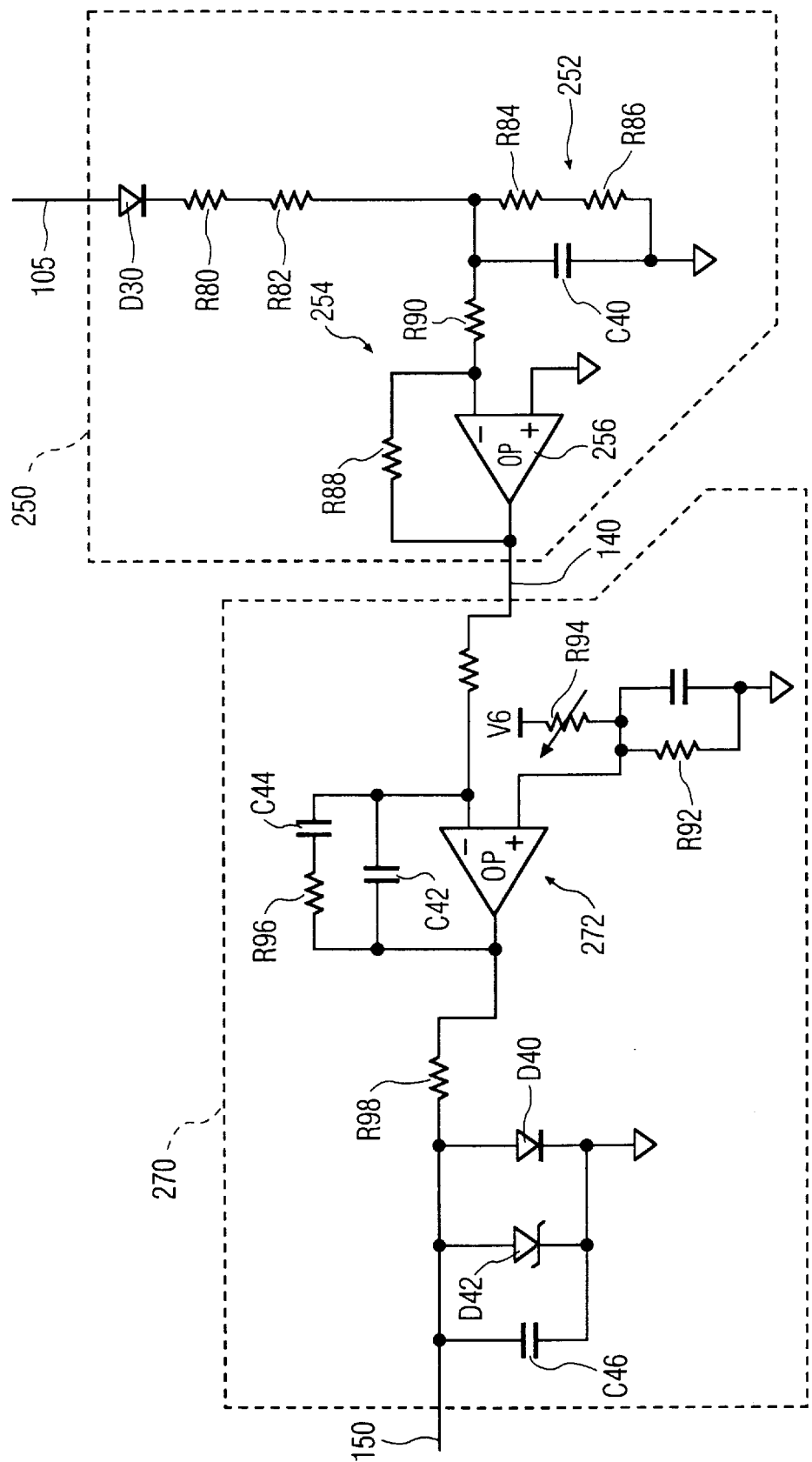
FIG. 9A is a schematic diagram of the voltage feedback and regulation circuitry.

In order to regulate the output voltage, a closed loop scheme may be implemented including voltage compensation circuitry, as illustrated in FIG. 9A. As described above, voltage regulation is possible by using the phase angle. With such a scheme, output voltage regulation may be performed by sensing the output voltage across the load. In the present embodiment, voltage across the load is present on line 105. The signal is rectified by diode D30 and scaling is applied by resistors R80 and R82 in series. Filtering of the signal is provided by the filter 252, including series resistors R84 and R86 in parallel with capacitor C40. The signal is amplified by noninverting amplifier 254, consisting of op-amp 256, with the ratio of resistance R88/R90 chosen to provide the proper gain.

The signal on line 140 subsequently is acted upon by the voltage compensator circuit 270. The reference voltage is applied to op-amp 272 at the noninverting terminal. Reference voltage V6 may be applied directly. Preferably, a voltage divider including R92 and potentiometer R94 may be used to provide a variable reference voltage. The op-amp 272 may be configured as a PI regulator, with the feedback path having a parallel combination of capacitor C42 with resistor R96 and capacitor C44 in series. The output of the PI regulator encounters resistor R98 and the parallel combination of diode D40, zener diode D42 and capacitor C46, which limit the dynamics of the signal in order to avoid saturating the components of the circuitry, namely JFETs T10 and T12 (FIG. 9), as will be described below.

With continued reference to FIG. 9, the output signal of compensator 270 is present on line 150. JFETs T10 and T12 are in series with resistors R58 and R56 respectively. Line 150 is connected to the gates of T10 and T12 and thereby controls the resistance at the noninverting terminals of the op-amps 228 and 230. Thus the phase angle shift φ may be precisely controlled.

Since the output voltage is a function of the operating frequency or the phase angle, output voltage regulation may be achieved by adjusting the phase angle in order to produce the desired output voltage. This scheme may find application in light dimming ballasts.

Following the phase shifting of the signal, the wave shaping circuitry 210 provides timing for the initiation of the switching as will be described below. A filter including capacitor C18 shapes the signal, and buffer 231 is a voltage follower interposed to provide a low output impedance and isolation from the input. The output of buffer 231 is on line 119. Noninverting amplifier 232 (FIG. 10) includes op-amp 234, and external resistors R60 and R62 are selected to scale the voltage. Filter 236 includes resistor R64 and capacitor C20.

Figure 10A:
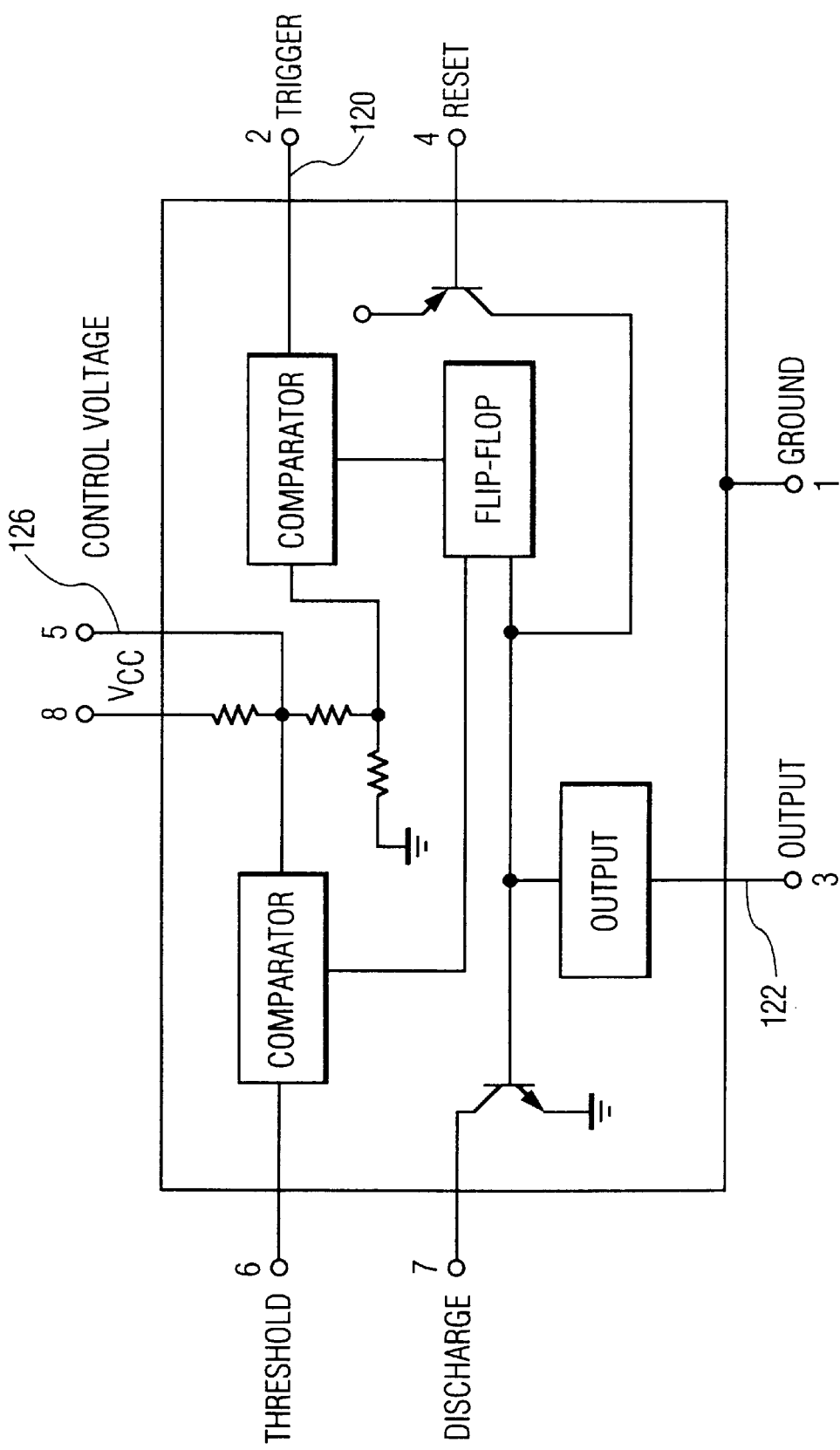
FIG. 10A is partial block diagram, partial schematic diagram of the timer circuit of FIG. 10.

With continued reference to FIG. 10, the switching signal is generated by a timing circuit, such as a standard 555 timing IC 300, an exemplary circuit being produced by Motorola, for example, the specifications of which are incorporated by reference herein and illustrated in FIG. 10A. Timer 300 is configured in the monostable mode wherein the driving signal is triggered to the "on" state by the zero-crossing of the phase-shifted current signal. Comparator 310 converts the substantially sinusoidal analog voltage signal from filter 236 to a square wave sequence which corresponds to the zero-crossing point of the shifted current signal. The comparator converts this zero-crossing point to set the leading edge of the switching pulse.

Applied voltage V1, in combination with resistors R66 and R68 and diode D30, provide a proper scaling to the signal applied to the inverter I1. High pass filter 238, including capacitor C22 and resistor R70 and diode D32 in parallel, and inverter I2 further shape the signal on line 120, which is connected to the trigger input (pin 2) of the timer 300. The threshold terminal (pin 7) and the discharge terminal (pin 6) are connected together in this mode. The control voltage at pin 5 is preset to a constant value by a voltage divider with resistors R72 and R74. The output signal is present on line 122 from output terminal (pin 3). Output signal on line 122 from timing circuit 300 and output on line 123 from start-up circuit 320 pass through OR gate 214 which acts as an electronic switch.

Figure 11:
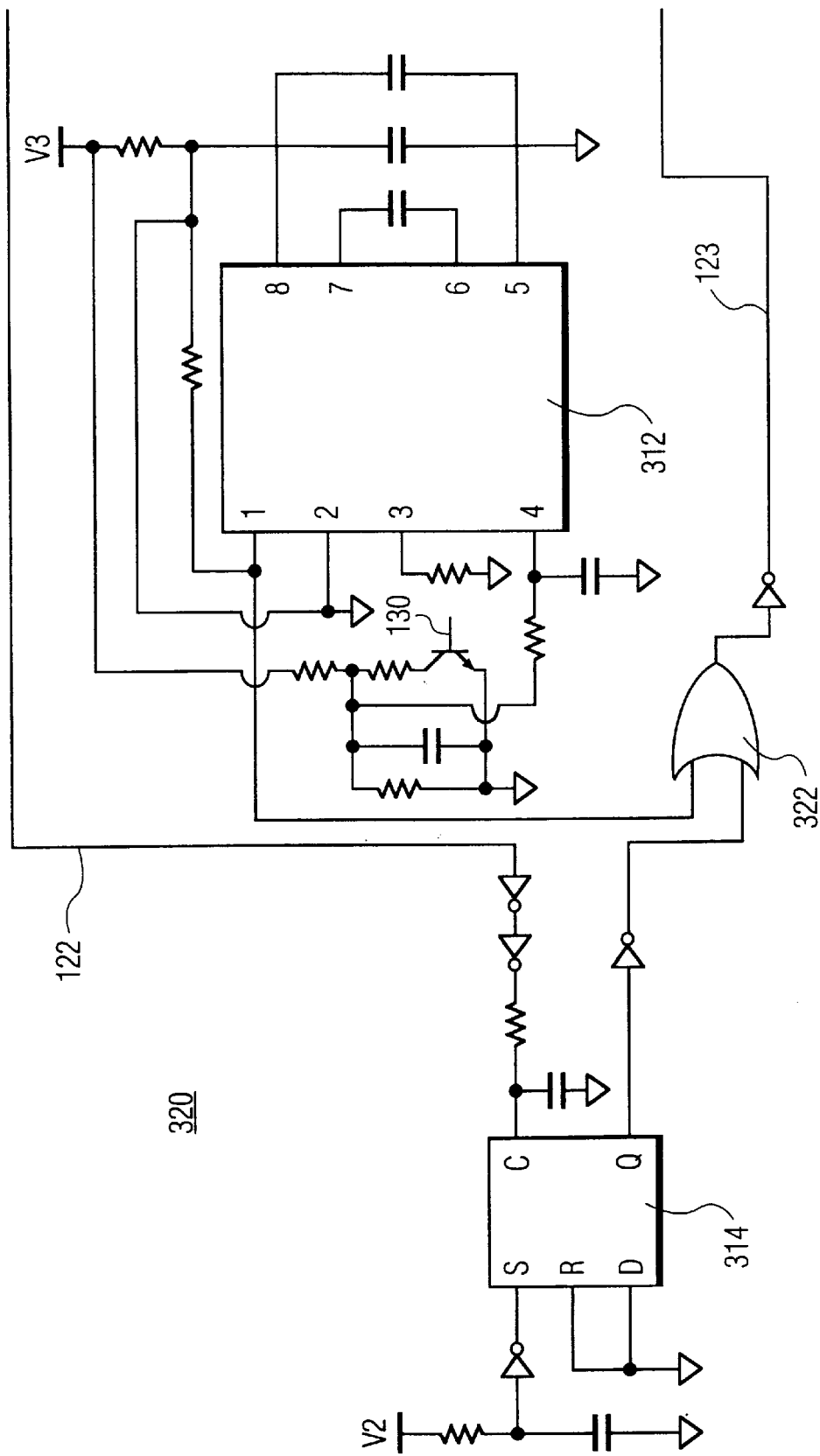
FIG. 11 is a schematic diagram illustrating the start-up circuitry.
Figure 12:
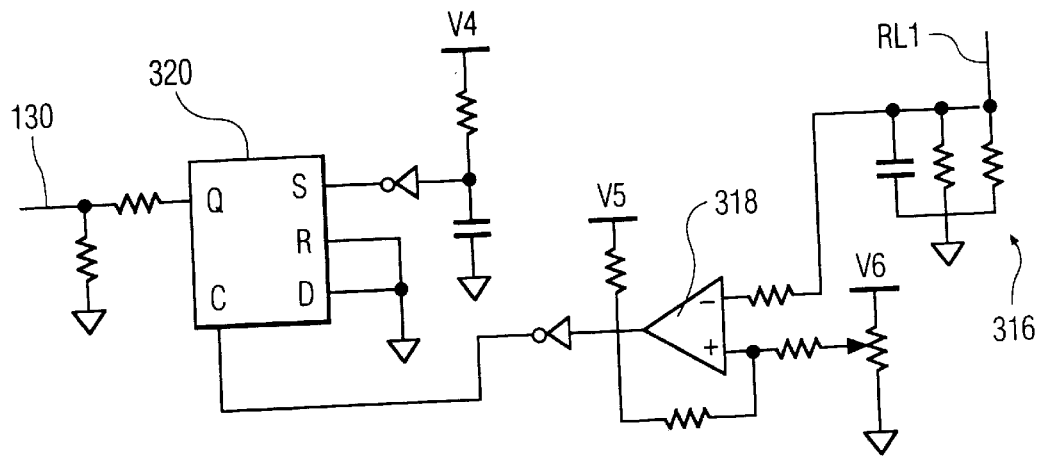
FIG. 12 is a schematic diagram illustrating the initiation frequency sweep function associated with start-up.

As illustrated in FIGS. 11–12, start-up circuit 320 provides the function of initial frequency sweeping for lamp ignition. Start-up circuit 320 includes voltage controlled oscillator (VCO) 312, single pulse flip-flop 314 in FIG. 11 and a DC voltage sensing and scaling circuit 316 (FIG. 12). VCO 312 is preferably a voltage-to-frequency converter AD654 produced by Analog Devices of Norwood, Mass., the specifications of which are incorporated by reference herein, although any suitable VCO is contemplated for use in this circuit. The start-up process is described as follows. In FIG. 11, before the DC bus voltage V is fully built up, the voltage on line 130 is low and the output pin Q of the flip flop 314 is high. VCO 312 starts to operate at high frequency region $f_{start}$ which leads to a high frequency square wave signal on line 123. The output voltage of the resonant circuit B is low due to the high frequency operation and lower DC bus voltage V.

When the DC bus voltage is increased to a preset threshold, the output voltage of comparator 318 in FIG. 12 is set to low. This in turn triggers the flip flop 320 and sets the voltage to high at line 130. Effectively, in FIG. 11, the voltage input at control voltage terminal (pin 4) of VCO 312 is reduced gradually. Correspondingly, the output frequency produced by VCO 312 is reduced. This process completes the frequency sweeping from high frequency $f_{start}$ to lower operating frequency $f_{op}$. Correspondingly, the resonant circuit output voltage to the lamp L1 is gradually increased until the lamp is ignited. After the lamp is operating, the processed current signal in line 122 triggers the flip-flop 314 and the output signal on line 123 is blocked by operation of the OR gate 322. Subsequently, the power supply in FIG. 8 operates at a self-oscillating frequency at a predetermined phase angle φ.

Figure 13:
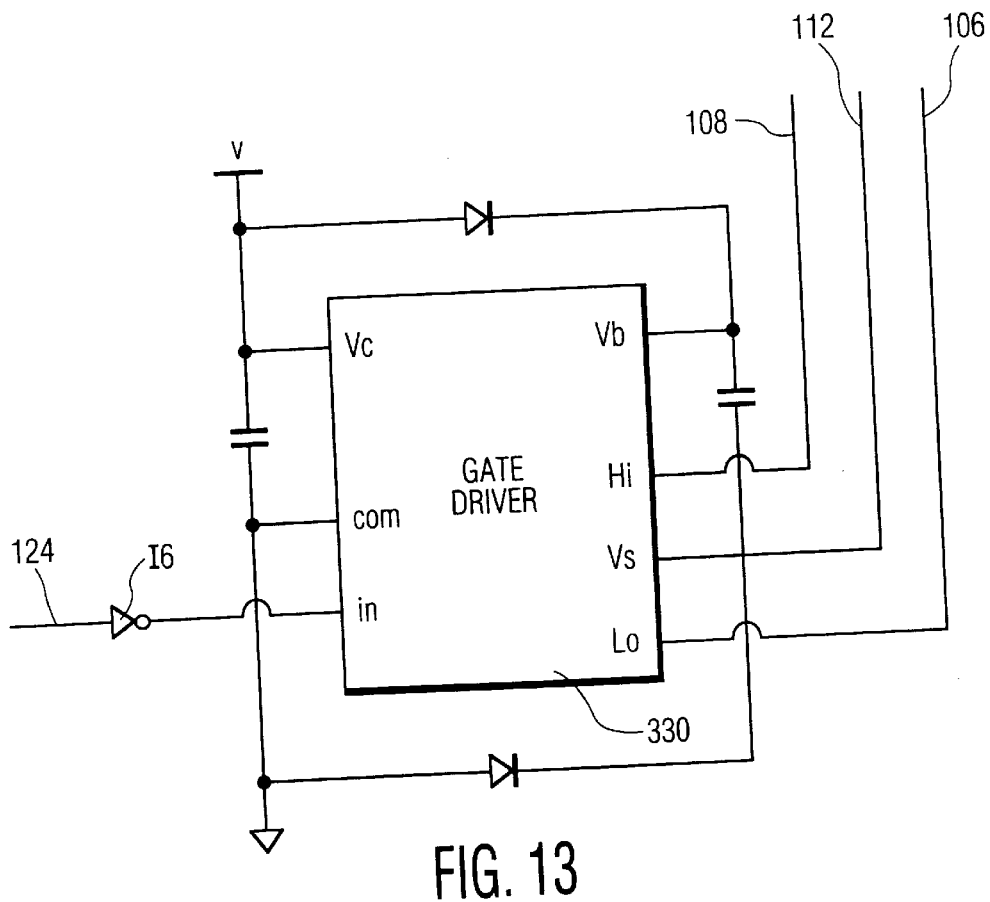
FIG. 13 is a schematic diagram illustrating the bridge driver circuitry.
Figure 13A:
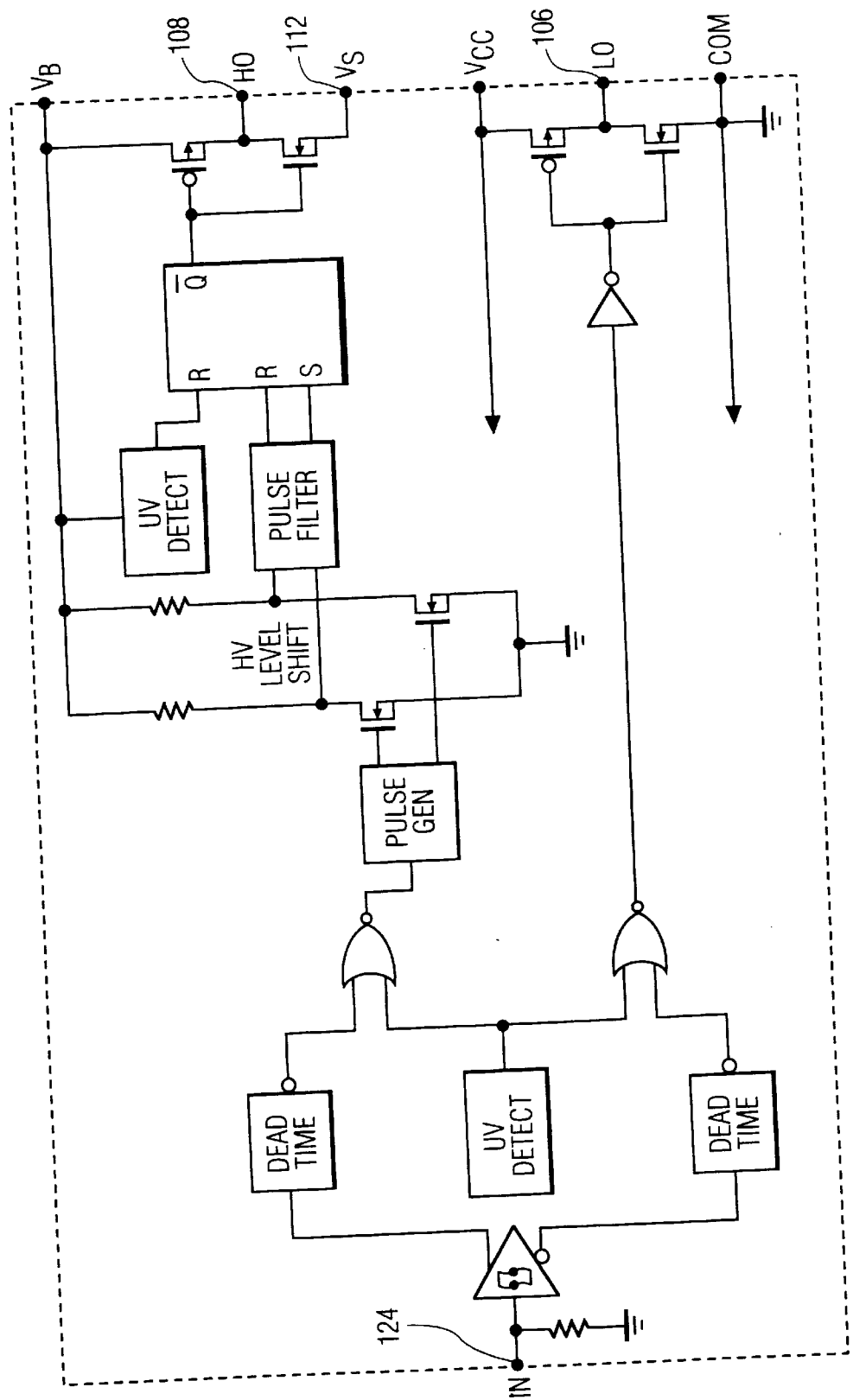
FIG. 13A is a schematic diagram illustrating the functions of the driver IC.

Turning now to FIG. 13, the signal on line 124 is inverted at logical inverter I6. The signal subsequently passes to the "in" terminal of gate driver 330, such as a half-bridge driver integrated circuit IR2111 produced by International Rectifier, El Segundo, Calif., the specifications of which are incorporated by reference herein and illustrated at FIG. 13A. With continued reference to FIG. 13, gate driver 330 includes logic to convert a single square wave input signal, such as that on line 124, into two separate driving signals on lines 108 and 106 which control switches Q1 and Q2, respectively. Gate driver 330 may be configured to produce signals 108 and 106 such that a blanking time exists in which neither Q1 nor Q2 conduct.

Figure 14:
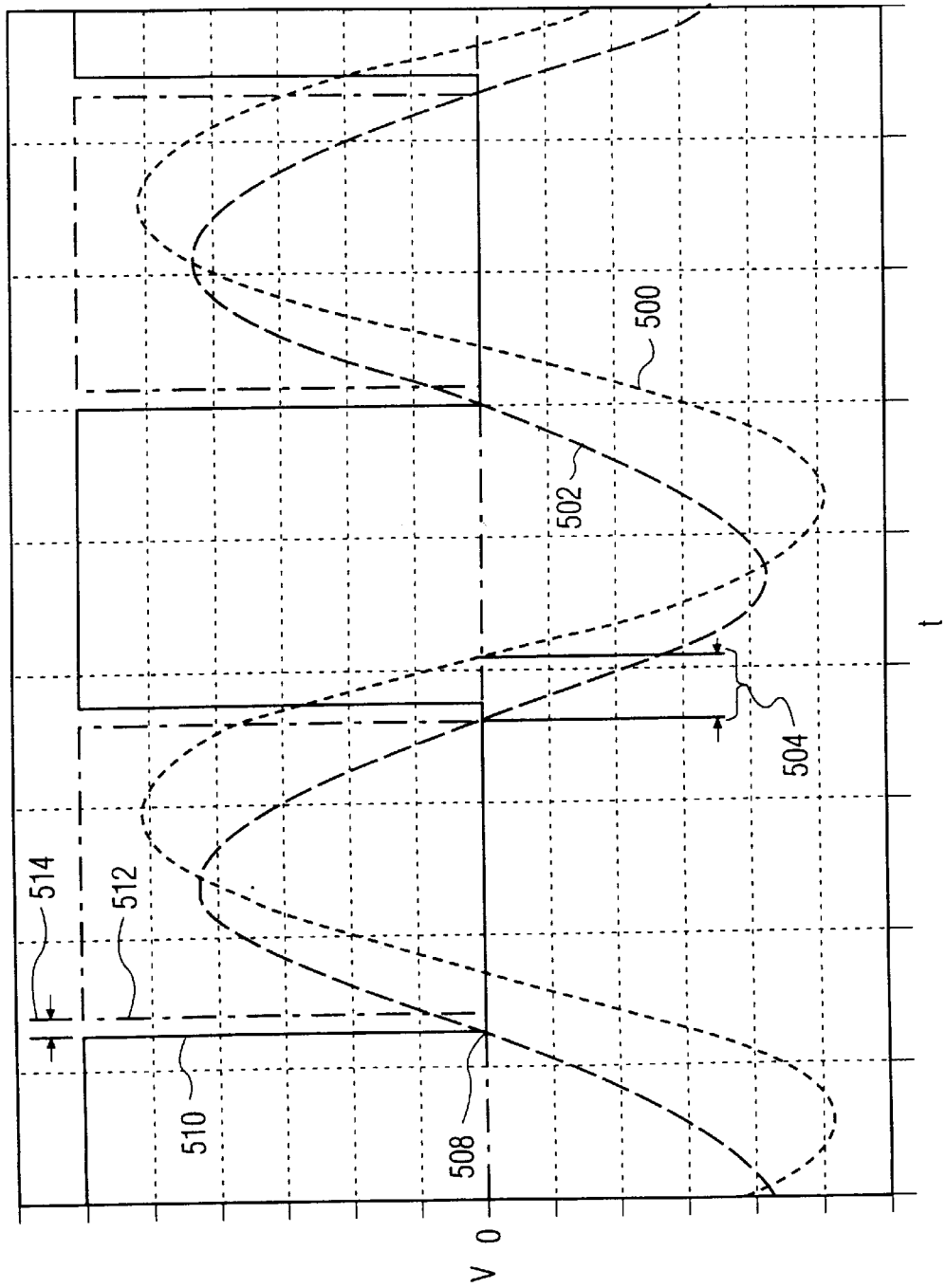
FIG. 14 is a time plot of the current flowing through the resonant circuit, the phase-shifted signal, and the switching sequence of the switches.

The waveforms produced by the above-described circuit are represented in the time plot illustrated in FIG. 14. The current flowing through the resonant circuit B is represented on the plot by signal 500. Within driving circuit C, this signal corresponds to the voltage signal on line 114, which is proportional to the current and has been filtered of lower frequency components by high-pass filter 204 (See, FIGS. 8–9). As described above, the signal on line 114 passes through automatic gain control 206 and phase-shifting circuitry 208. The phase shifted signal 502 (FIG. 14) corresponds to the output of phase-shifting circuitry 208 on line 118 (See, FIG. 9). The phase-shifted signal 502 is phase-shifted by an amount 504 corresponding to $\phi$ as described above. The zero-crossing point of signal 502 is used as the reference to control switching. Thus, at the zero-crossing point 508, switch Q1 is turned off, as indicated by line 510 (solid line) and switch Q2 is turned on, as indicated by line 512 (dot-dash line). The figure illustrates that Q2 is turned on at the same time that Q1 is turned off. A blanking time 514 is ordinarily provided by driver 304 such that Q1 and Q2 are both off for a brief period of time. When the system load changes, the voltage compensator 270 in FIG. 9(a) generates an appropriate control signal on line 150 of FIG. 9(a), which is effectively connected to the gates of JFETS T10 and T12 in FIG. 9, As a result, the phase angle $\phi$ is adjusted accordingly such that the output voltage is regulated.

Figure 15:
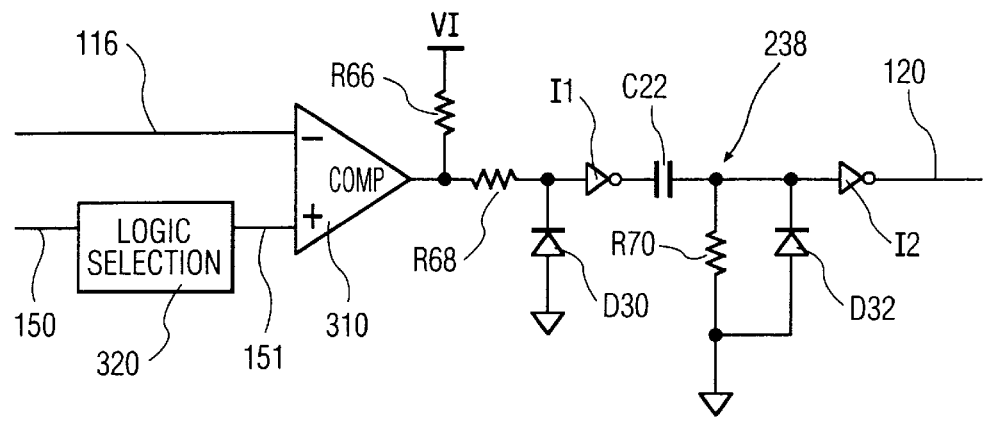
FIG. 15 is a schematic diagram of an alternative embodiment of the subject invention.

An alternative embodiment is shown at FIG. 15. A controllable hysteresis threshold may be implemented as described above with respect to FIGS. 3 and 6. Comparator 310 converts the substantially sinusoidal analog voltage signal from op-amp 226 to a square wave sequence which corresponds to the crossing points of the current signal with the threshold settings $\epsilon 1$ and $\epsilon 2$. The logic selection unit 320 converts the basic unipolar DC signal in line 150 into a bipolar DC signal at line 151, which serves as the threshold value $\epsilon 1$ and $\epsilon 2$ as in FIG. 3. The comparator detects these crossing points to set the leading edge of the switching pulse. In such an implementation, the converted voltage sensing on line 150 of FIG. 9A and the filtered current signal on line 116 of FIG. 9 are inputs to the comparator. In particular, the voltage signal 150 via the logic selection unit 320 would be fed into the non-inverting input of the comparator 310 and the current signal 116 would be fed into the inverting input of the comparator 310. It is also contemplated that the phase-shifting circuitry be applied as shown in FIGS. 9 and 9A to the current signal and a hysteresis control be used in conjunction therewith to adjust the driving signal and consequently the switching times. It is further contemplated that a Schmitt trigger or other voltage level detector may be used in the circuit as an alternative to the comparator 310.

Figure 16:
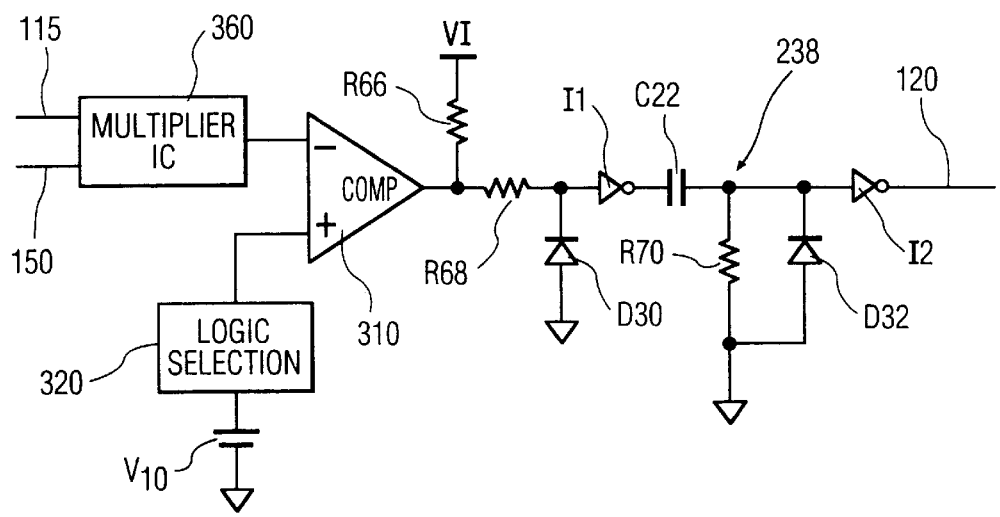
FIG. 16 is a schematic diagram of a second alternative embodiment of the subject invention.
Figure 17:
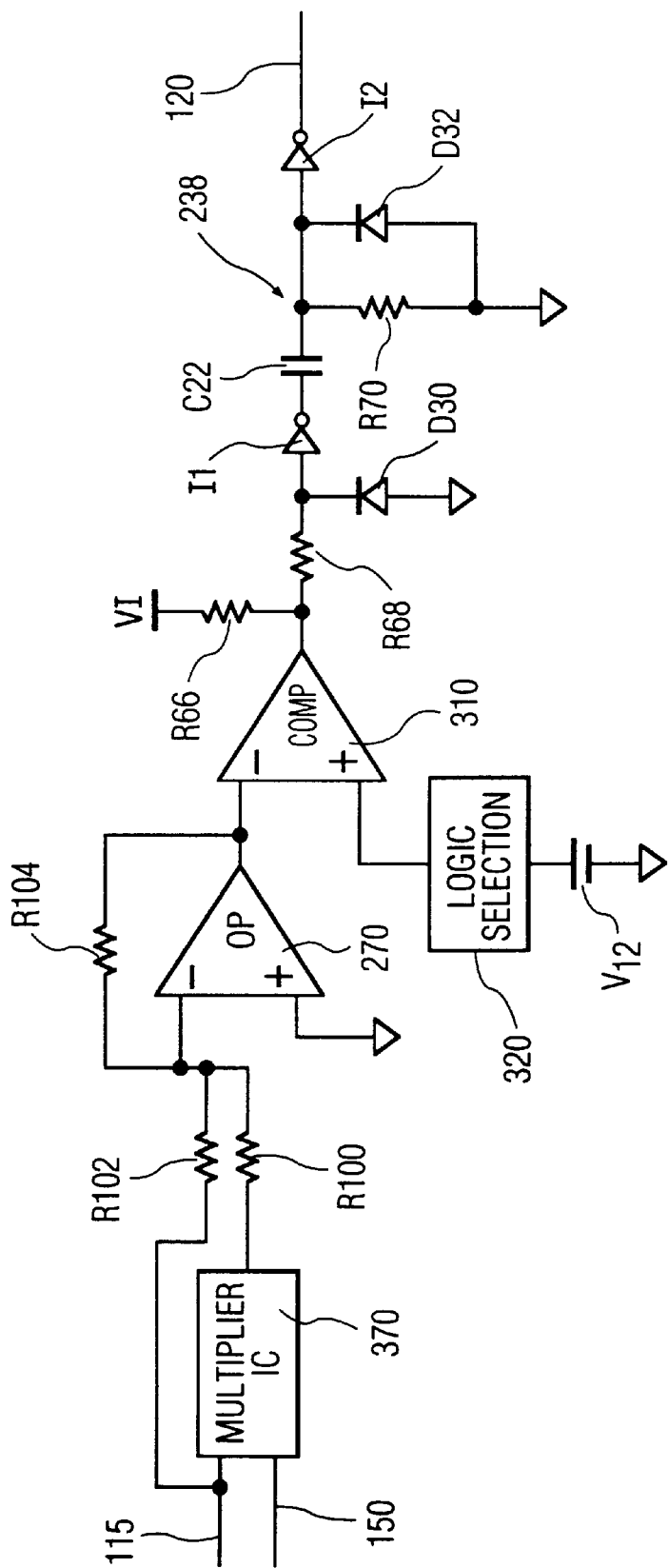
FIG. 17 is a schematic diagram of a third alternative embodiment of the subject invention.

FIGS. 16 and 17 illustrate second and third alternative embodiments of the subject invention. In these embodiments, the hysteresis threshold, e.g. $\epsilon 1$ and $\epsilon 2$, is fixed, rather than controllable. Thus, a constant voltage V10 and V12, through a logic selection unit 320, is applied to the non-inverting input of comparator 310 in the embodiments of FIG. 16 and FIG. 17, respectively. It is also contemplated that voltages V10 and V12 may be variable. The circuits are substantially as described above with respect to the previous embodiments, with the differences noted hereinbelow. In the second embodiment of FIG. 16, the output voltage signal of the voltage compensator 270 on line 150 (FIG. 9A) and the sensed current signal on line 115 (FIG. 9) are multiplied in multiplying IC 360, and the product of the two signals is directed to the inverting input of comparator 310. By doing so, the relative magnitude between the sensed current signal and the threshold $\epsilon 1$ and $\epsilon 2$ is changed with reference to FIG. 3, In this case, the thresholds $\epsilon 1$ and $\epsilon 2$ are fixed while the sensed current signal is multiplicatively scaled up or down controlled by the output signal on line 150 of the voltage compensator 270. Consequently, the switching time $\Delta t_1$ and $\Delta t_2$ are adjusted in FIG. 3. In return, the phase angle $\phi$ is controlled.

In the third embodiment of FIG. 17, the control voltage signal on line 150 (FIG. 9A) and the sensed current signal on line 115 (FIG. 9) are added via the combination of multiplying IC 370 and op-amp 270. By doing so, the relative magnitude between the sensed current signal and the thresholds $\epsilon 1$ and $\epsilon 2$ is changed with reference to FIG. 3. In this case, the thresholds $\epsilon 1$ and $\epsilon 2$ are fixed while the sensed current signal is multiplicatively and additively scaled up and down controlled by the output signal on line 150 of the voltage compensator 270. This means that the switching times $\Delta t_1$ and $\Delta t_2$ are adjusted as in FIG. 3. In return, the phase angle $\phi$ is controlled.

In another alternative embodiment, it is contemplated that output power, rather than voltage alone, may be controlled. For example, lamp power may be regulated for applications such as dimming. The phase angle shift control method described above for voltage regulation may be used for power regulation with the following modifications. The lamp power signal is sensed and fed back to the control circuits. In a preferred embodiment, a voltage sensing line is positioned at the anode of the lamp L1 to sense lamp voltage. By adding a small resistor in series with the lamp and sensing the voltage across the inserted resistor, lamp current information may be obtained. By further multiplying the sensed lamp voltage and current signal using a standard analog multiplier IC, a feedback signal is produced which is proportional to the lamp power and is fed back to the control circuit compensator. A reference lamp output power is selected. By comparing the feedback signal with the reference power, a compensator provides a phase shift command to the phase shifting circuitry. In such a way, the lamp output power is regulated.

While there has been shown to be what are presently considered to be the preferred embodiments of the invention, it will be apparent to those of ordinary skill in the art that various modifications can be made without departing from the scope of the invention as defined by the appended claims. Accordingly, the disclosure is illustrative only and not limiting.

What is claimed is:

1. A power supply, which comprises:
   a) a resonant circuit having an output voltage and a current oscillating therethrough;
   b) a voltage-fed half-bridge inverter producing a supply voltage at an output coupled to the resonant circuit, the inverter being responsive to a driving signal; and
   c) a driving circuit producing the driving signal, the driving circuit comprising:
      i) voltage compensation circuitry regulating said output voltage with respect to a reference voltage and commanding a phase shift angle; and
      ii) phase-shifting circuitry applying a phase-shift to a sensed current signal, the amount of phase shift being commanded by the voltage compensation circuitry.

2. A power supply as claimed in claim 1, wherein the driving circuit further comprises circuitry for comparing the phase-shifted sensed current signal with at least one reference.

3. A power supply as claimed in claim 2, wherein the one reference is a function of the phase-shift angle.

4. A power-supply as claimed in claim 2, wherein the circuitry for comparing the phase-shifted sensed current signal with the at least one reference comprises a hysteresis relationship.

5. A power supply as claimed in claim, 2, wherein the driving circuit further comprises means for scaling the sensed current signal with respect to a voltage signal of the voltage compensator.

6. A power supply as claimed in claim 2, wherein the driving circuit further comprises means for adding the sensed current signal with an output signal of the voltage compensator.

7. A power supply, which comprises:
   a) a resonant circuit having an output voltage, an output power, and a current oscillating therethrough;
   b) a voltage-fed inverter producing a source voltage at an output coupled to the resonant circuit, the inverter being responsive to a driving signal;
   c) means coupled to the resonant circuit for deriving a sensed current signal determined by the current flowing in the resonant circuit, and
   d) a driving circuit producing the driving signal, the driving circuit comprising:
      i) power compensation circuitry regulating said output power with respect to a reference power signal and commanding a phase shift angle; and
      ii) phase-shifting means applying a phase-shift to the sensed current signal with the amount of phase shift commanded by the power compensation circuitry.

8. A method for switching a power supply, which comprises:

providing a resonant circuit having a current oscillating therethrough and an output voltage;

providing an inverter responsive to a driving signal and producing a voltage at an output coupled to the resonant circuit;

detecting the output voltage and comparing the output voltage with a reference voltage;

commanding a phase-angle shift to reduce the difference between the output voltage and the reference voltage;

applying the phase-angle shift to a signal representing the current oscillating through the resonant circuit and producing a phase-shifted current signal; and driving the inverter based upon the phase-shifted current signal.

9. A method for switching a power supply as claimed in claim 8, wherein the step of driving the inverter further comprises:

comparing the phase-shifted current signal with a hysteresis threshold.

10. A method of switching a power supply as claimed in claim 8 which further comprises actuating a switching device in the inverter when the phase-shifted current signal crosses a zero value.

11. A power supply as claimed in claim 1 wherein the phase-shifting circuitry applies a positive phase angle shift to the sensed current signal such that the inverter output leads the sensed current signal with a predetermined positive phase angle.

12. A power supply as claimed in claim 1 wherein the driving signal produced by the driving circuit actuates a transistor switch in the inverter when the phase-shifted sensed current signal crosses zero.

13. A power supply as claimed in claim 1 wherein the phase-shifting circuitry includes an all-pass filter and the voltage compensation circuitry is responsive to a feedback signal determined by the output voltage of the resonant circuit.

14. A power supply as claimed in claim 1 wherein the inverter comprises first and second transistor switches connected in series circuit across a pair of terminals which supply a DC voltages, and the resonant circuit comprises a first inductor and a capacitor connected in series to a circuit node intermediate the first and second transistor switches and a second inductor connected in parallel with the capacitor and adapted to be coupled to a load.

15. A power supply as claimed in claim 1 wherein the sensed current signal is determined by and represents the current oscillating in the resonant circuit.

* * * * *